Oct. 9, 1928.

F. FORMÁNEK ET AL 1,687,198

AEROHELICOPTER

Filed April 18, 1927    3 Sheets-Sheet 1

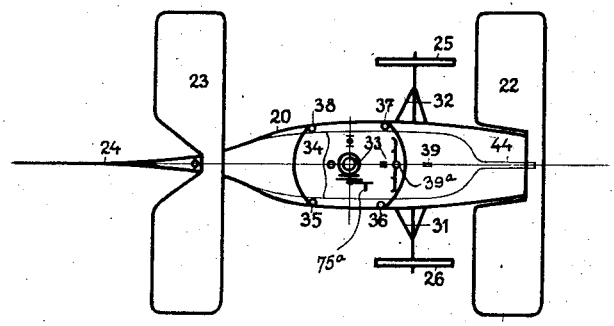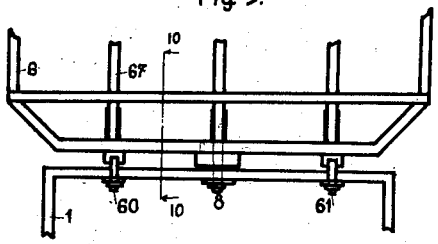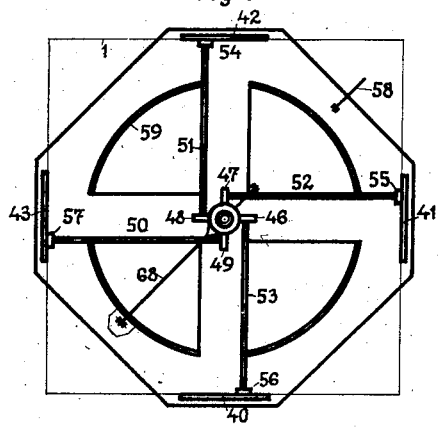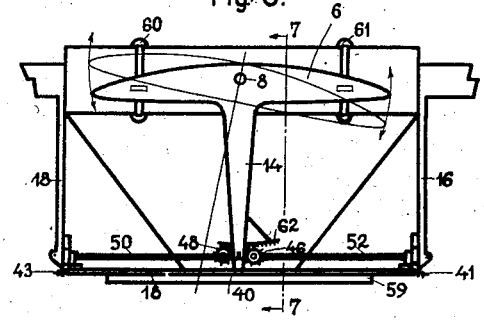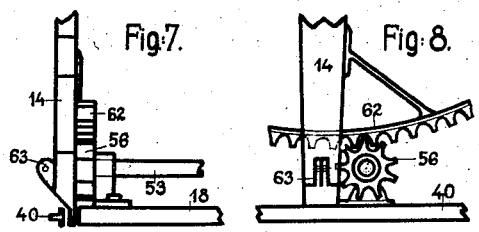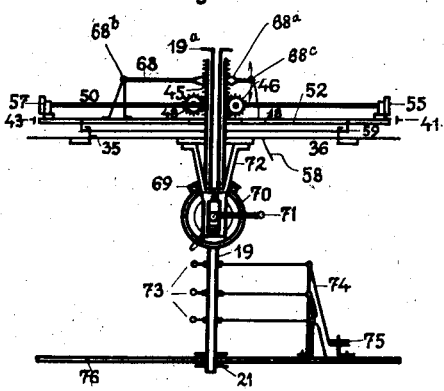

Oct. 9, 1928.
F. FORMÁNEK ET AL
1,687,198
AEROHELICOPTER
Filed April 18, 1927    3 Sheets-Sheet 3
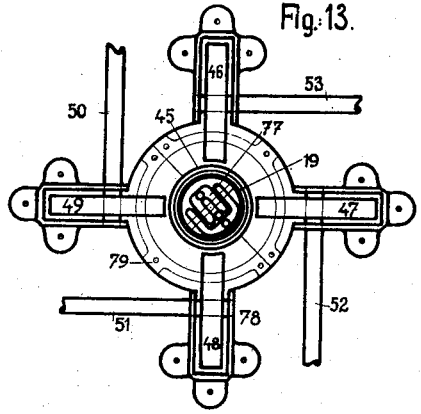
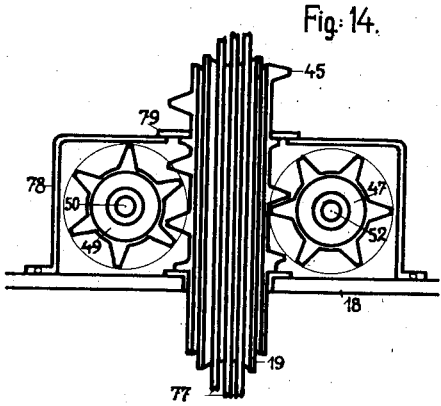
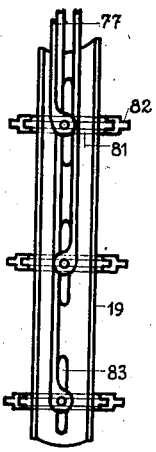
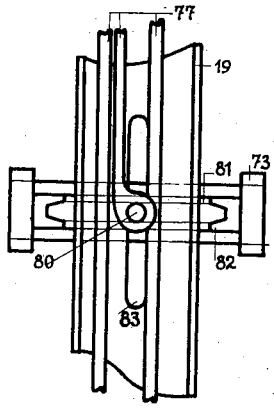
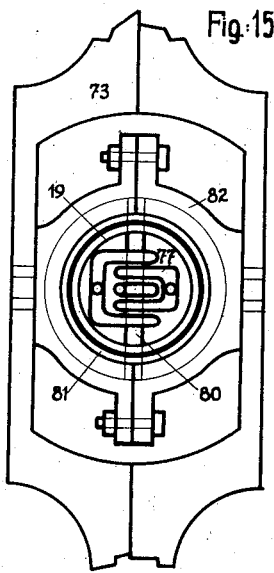
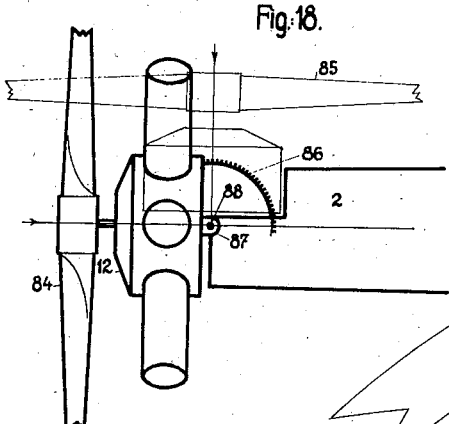
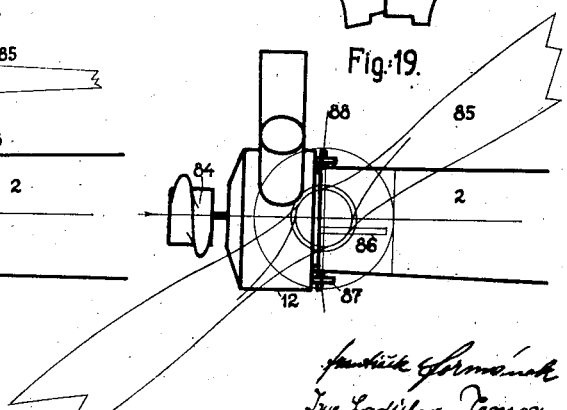

Patented Oct. 9, 1928.

1,687,198

UNITED STATES PATENT OFFICE.

FRANTIŠEK FORMÁNEK, LADISLAV ZEMAN, AND EDMUND ZEMAN, OF BRATISLAVA, CZECHOSLOVAKIA.

AEROHELICOPTER.

Application filed April 18, 1927. Serial No. 184,448, and in Czechoslovakia December 26, 1925.

This invention relates to heavier than air flying machines, and has for its object to provide an improved aircraft in which shall be combined both the properties of an aeroplane and also those of a helicopter in that it shall be capable not only of horizontal flight and of volplaning in the manner of an ordinary aeroplane, but also of vertical ascent and descent and of hovering in any desired position in the manner of a helicopter.

To this end, an aircraft in accordance with the invention comprises a fuselage containing a cockpit for a pilot and carrying a rudder, elevating fins and alighting gear, a central framework constituting a hub and secured to said fuselage so as to be rotatable at will relatively thereto about an upright axis, a pair of arms extending radially from the hub at opposite sides of said upright axis, two air screws mounted, one at the end of each radial arm and adapted to be rotated coaxially with said pair of arms or alternatively substantially in a vertical plane parallel with longitudinal axis of said pair of arms, means for driving said air screws, and four supporting planes extending radially from the central framework or hub and so attached thereto as to be adjustable angularly at will, simultaneously and in the same sense, each about its longitudinal axis to the desired angle of incidence; the arrangement being such that, in order to cause the machine to rise after the manner of a helicopter, the air screws are moved into positions such that their axes of rotation are horizontal and normal to the axes of the radial arms and thus, when rotating, cause the central framework or hub and the four supporting planes carried thereby to rotate, and, that when it is desired that the machine should fly horizontally after the manner of an aeroplane, said air screws are moved so that their axis of rotation continues the axis of the pair of arms at each end thereof, the one air screw acting then as a tractor and the other as a propeller.

Figure 1:
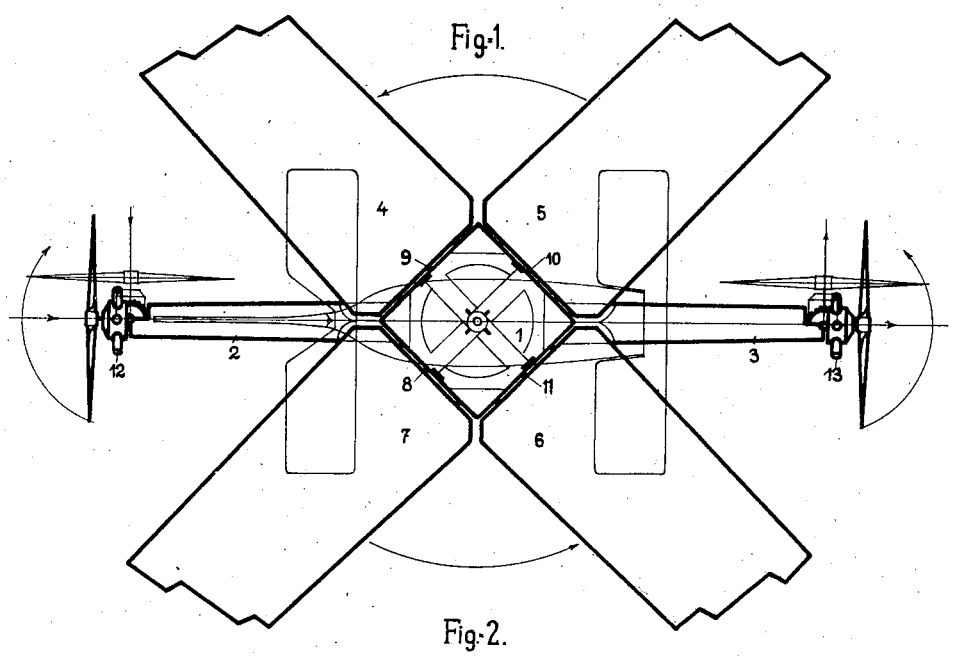
Figure 2:
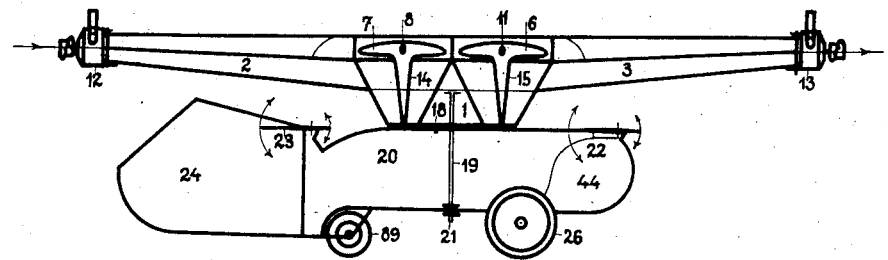
Figure 3:
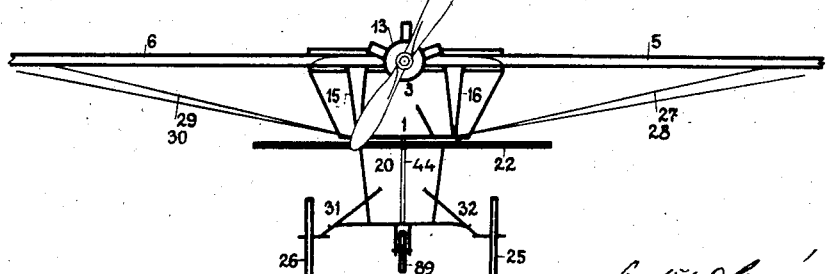

In the accompanying drawings:

Figures 1, 2 and 3 of the drawings are views showing the improved flying machine in plan, side elevation, and end elevation respectively; Figure 4 is a plan view of the fuselage alone; Figure 5 is a horizontal cross sectional plan view of the lower part of the central framework or hub, on an enlarged scale; Figure 6 is a view showing a vertical section taken transversely through one of the supporting planes near its inner end, also on an enlarged scale; Figure 7 is a view showing a vertical section taken on the line 7—7 of Figure 6, and Figure 8 is a corresponding face view, both on a further enlarged scale; Figures 9, 10 and 11 show details of the attachment of the supporting planes to the central framework or hub, Figure 10 being a cross sectional view on the line 10—10 of Figure 9, and Figure 11 being a corresponding face view; Figure 12 illustrates part of the control gear and is a fragmentary view of a section vertically through the contiguous portions of the fuselage and hub; Figure 13 is a view on an enlarged scale showing, in horizontal cross section, the central portion of that part of the control gear which is situated in the bottom of the central framework or hub; Figure 14 is a view of the same parts in vertical cross-section, on a still more enlarged scale; Figures 15, 16 and 17 are sectional fragmentary views illustrating, to different scales, the manner of which the motor control rods are arranged within the hollow upright shaft; and Figures 18 and 19 are fragmentary views showing, in plan and elevation respectively one of the two propellers, its driving motor and the mounting therefor.

As shown, the improved flying machine comprises essentially a fuselage 20, having landing wheels 25, 26 and 89, mounted on springs 31, 32, a rudder 24 and elevating vanes 22, 23. A central hub 1 is secured to the top of the fuselage 20 by means of hook-shaped retaining members 35, 36, 37 and 38 (Figure 4) and an internally grooved guide ring 59 (Figures 5 and 12). A hollow upright shaft 19 is mounted rotatably within a double ball bearing 21 at the bottom of the fuselage, and secured fast to the hub 1. Arms 2 and 3 extend radially from the hub 1 and have at their outer ends driving motors 12 and 13 and air screws, as shown in Figures 1 and 2, and four supporting planes 4, 5, 6 and 7 are attached pivotally to the upper portion of the hub, as at 9, 10, 11 and 8 (Figure 1) and which are adjustable angularly about their longitudinal axes.

Depending vertically from the supporting planes 4, 5, 6 and 7 near their inner ends are members 14, 15, 16 and 17 (Figures 2 and 3) which project at their lower ends into slots 40, 41, 42 and 43 in the lower portion of the central hub 1, as indicated clearly at 40 (Figure 7), lugs being secured to the lower ends of said members 14, 15, 16 and 17, as shown at 63 (Figure 7) for the attachment of stay wires 27, 28, 29 and 30 (Figure 3).

It is to be observed that in horizontal cross section the central hub 1 is square at its top (see Figure 1), and octagonal at its bottom (Figure 5).

Each supporting plane 4, 5, 6 and 7 is attached to one of the four sides of the top of the central hub 1, see Figures 9, 10 and 11, by means of a pivot 11 and guides 60 and 61, the guides 60 and 61 comprising each a guide member 65, the threaded ends of which pass through the wall of the hub 1 and are secured by means of nuts retaining in position thereover a plate 64, as indicated in Figures 10 and 11, and an eye-shaped member 66 fitting loosely around the guide member 65 and secured to a longéron 67 of the corresponding supporting plane 6.

Surrounding the central portion of the hollow upright shaft 19 is a tubular shaft 19$^a$ having fastened upon its lower end a bevel wheel 69 and at its upper end a steep pitch worm 45. The tubular shaft is mounted at its lower end in a bearing provided in a casing 72 secured to, and depending from the roof of the pilot's cockpit. In a second bearing on the casing 72 is mounted a second bevel wheel 70 provided with a handle 71 and means, not shown, whereby it may be slid upwardly into engagement with the bevel wheel 69 against the action of a spring, not shown, which normally retains said wheel 70 out of engagement with the wheel 69.

The lower portion of the worm 45 and four worm wheels 46, 47, 48 and 49, see Figures 5, 13 and 14, are enclosed within a casing 79 in which are provided bearings for the tubular shaft 19$^a$ and for shafts 50, 51, 52 and 53 of the worm wheels 46, 47, 48 and 49. The worm 45 is interrupted at the upper bearings of the tubular shaft 19$^a$, see Figure 14, and is continued thereabove to receive an internally threaded sleeve 68$^a$ which is pivotally attached to, and intermediately of the length of, a lever 68, the latter being attached pivotally at one end 68$^b$, Figure 12, to an abutment secured to the bottom of the hub 1, while attached to the other end 68$^c$ of said lever 68 is a cable 58, connected at its other end with a locking member 39$^a$ which is spring influenced so as to tend always to protrude downwardly through a slot in the bottom of the hub 1 into engagement with a slot 39 provided in the roof of the fuselage 20.

Fastened upon the outer ends of the shafts 50, 51, 52 and 53 (Figure 5) are pinions 57, 55, 54, and 56, each of which meshes with a segmental rack 62 attached to the lower part of the member 14 depending downwardly from the inner end of the corresponding supporting plane 6.

Each of the driving motors 12 and 13 is mounted, with its respective air screw 84 upon a short stub axle (Figures 18, 19) adapted to be adjusted angularly about a vertical spindle 88 secured to the end of the corresponding arm 2, the ends of which support two lugs 87 attached to the body of the motor 12, and a rod, one end of which is connected at 68$^c$ with the lever 68 serves to set in motion, when desired, automatic mechanism including the segmental rack 86 which is adapted angularly to adjust the motor 12 and air screw 84 about the spindle 88, from the position shown in heavy lines, Figures 18 and 19, to that indicated by the reference 85 and shown in faint lines, or vice versa.

Control rods 77, 77 for the driving motors extend vertically within the hollow upright shaft 19 and are operated individually by means of a series of levers 73, 73 in Figures 4 and 12, which are attached pivotally to an abutment 74, secured to the floor of the pilot's cockpit, and to the bottom of which is attached pivotally a foot central 75 for the operation of the rudder 24. Hand controls for the operations of the elevators 22 and 23 being provided e. g. as at 75$^a$, Figure 4, at one side of the hollow upright shaft 19. To the lower ends of the control rods 77 are attached, by means of short couplings 80 (Figures 16, 17 and 18) which extend transversely and project at their ends through diametrically opposite longitudinal slots 83 formed in the walls of the hollow upright shaft 19, rings 81 each of which latter is received, see Figure 17, in an internal circumferential groove in a clasp 82 in turn, attached pivotally, by the coupling 80 to the corresponding operating lever 73.

For the purpose of vertical ascent or descent, the locking member 39$^a$ on the hub 1 is withdrawn from the slot 39 in the top of the fuselage 20, the driving motors and their air screws are caused to assume the positions shown in faint lines at 85, Figures 18 and 19, and the carrying surfaces 4, 5, 6, and 7, are adjusted angularly in the same sense through a small angle. The controlling mechanism being so arranged that all these adjustments may be effected simultaneously by engaging the bevel wheel 70 with its fellow 69 and rotating the former in the proper direction by means of its handle 71. The rate and direction of vertical flight is controlled by the angular position of the planes 4, 5, 6 and 7 and the velocity at which the air screws cause the hub 1 and said planes to rotate with regard to the fuselage, which latter is restrained from rotative motion by the rudder 24 and the elevating vanes 22 and 23, which latter are preferably set to vertical position.

In order to revert from vertical flight in either direction or from hovering at any desired altitude, to horizontal flight or volplaning, the air screws are returned to the positions shown in Figures 1 and 2, the locking member 39ª is permitted to engage in the slot 39 so as to lock the hub 1 relating to the fuselage 20, the supporting planes are adjusted angularly and in the same sense to positions such as that shown in Figure 6, all these operations taking place simultaneously upon the reverse rotation of the bevel wheels 70 and 79 while the rudder 24 is brought into operation for steering and the elevating vanes 22, 23 are employed for controlling the rise or fall of the air craft.

What we claim as new is:—

1. An aircraft comprising a fuselage containing a cock-pit for a pilot and carrying a rudder, elevating fins and alighting gear, a central framework constituting a hub secured to said fuselage so as to be rotatable at will relatively thereto about an upright axis, a pair of arms extending radially from the hub at opposite sides of said upright axis, the air screws mounted, one at the end of each radial arm, and adapted to be rotated coaxially with said pair of arms or alternatively substantially in a vertical plane parallel with the axis of said arms, means for driving said air screws, and four supporting planes extending radially from the central framework or hub and so attached thereto as to be adjustable angularly at will, simultaneously in the same sense, each about its longitudinal axis, to the desired angle of incidence.

2. An aircraft as claimed in claim 1, wherein the central framework or hub is square at its top and octagonal at its bottom in horizontal cross-section; each of the four supporting planes being attached at its inner end to one of the four sides of the square portion of the central framework or hub.

3. An aircraft as claimed in claim 1, wherein an upright shaft connects the central framework or hub with the fuselage, and wherein a worm mounted upon said shaft and rotatable from the fuselage, controls simultaneously, through suitable worm wheels, shafts, pinions and segmental racks, the angular position of said supporting vanes.

4. An aircraft as claimed in claim 2, wherein an upright shaft connects the central framework or hub with the fuselage, and wherein a worm mounted upon said shaft and rotatable from the fuselage, controls simultaneously, through suitable worm wheels, shafts, pinions and segmental racks, the angular position of said supporting vanes.

Prague, Czechoslovakia, the 22d day of February, 1927.

FRANTIŠEK FORMÁNEK.
ING. LADISLAV ZEMAN.
ING. EDMUND ZEMAN.